United States Patent
Nishimori et al.

(10) Patent No.: US 12,372,221 B2
(45) Date of Patent: Jul. 29, 2025

(54) LIGHT SOURCE SYSTEM

(71) Applicant: Panasonic Intellectual Property Management Co., Ltd., Osaka (JP)

(72) Inventors: Taisuke Nishimori, Osaka (JP); Hiroshi Kitano, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/852,131

(22) PCT Filed: Mar. 9, 2023

(86) PCT No.: PCT/JP2023/009041
§ 371 (c)(1),
(2) Date: Sep. 27, 2024

(87) PCT Pub. No.: WO2023/189351
PCT Pub. Date: Oct. 5, 2023

(65) Prior Publication Data
US 2025/0207759 A1     Jun. 26, 2025

(30) Foreign Application Priority Data
Mar. 30, 2022 (JP) .................. 2022-057418

(51) Int. Cl.
*F21V 14/00* (2018.01)
*F21V 9/30* (2018.01)
(Continued)

(52) U.S. Cl.
CPC ............ *F21V 14/003* (2013.01); *F21V 9/30* (2018.02); *F21Y 2113/13* (2016.08); *F21Y 2115/30* (2016.08)

(58) Field of Classification Search
CPC .. G03B 21/204; G03B 33/12; G03B 21/2013; G02B 27/141; G02B 27/1006;
(Continued)

(56) References Cited

U.S. PATENT DOCUMENTS 10,908,430 B2 * 2/2021 Matsunobu .......... A61B 5/0071
2012/0140183 A1   6/2012 Tanaka et al.
(Continued)

FOREIGN PATENT DOCUMENTS

JP     2004-045634 A     2/2004
JP     2007-156438 A     6/2007
(Continued)

OTHER PUBLICATIONS

International Search Report dated Apr. 18, 2023 issued in International Patent Application No. PCT/JP2023/009041, with English translation.

*Primary Examiner* — William J Carter
(74) *Attorney, Agent, or Firm* — Rimon P.C.

(57) ABSTRACT

A first light source device emits first light having a first wavelength. A second light source device emits second light having a second wavelength longer than the first wavelength. A splitting unit is configured to split the first light into third light having a third wavelength same as the first wavelength and fourth light having a fourth wavelength same as the first wavelength. A wavelength converter is configured to be excited by the third light to emit fifth light having a luminescence peak at a fifth wavelength between the third wavelength and the second wavelength. A combining optical system is configured to combine the second light, the fourth light, and the fifth light together. A control device is configured to control a light output of the second light source device and a split ratio between the third light and the fourth light in the splitting unit.

9 Claims, 5 Drawing Sheets (51) Int. Cl.
*F21Y 113/13* (2016.01)
*F21Y 115/30* (2016.01)

(58) Field of Classification Search
CPC ............... G02B 27/283; G02B 26/008; G02B 27/1033; F21V 14/00; F21V 9/30; F21Y 115/30; F21Y 113/13
See application file for complete search history.

(56) References Cited

U.S. PATENT DOCUMENTS

| | | |
|---|---|---|
| 2012/0268917 A1 | 10/2012 | Kitano et al. |
| 2014/0285772 A1 | 9/2014 | Tajiri |
| 2018/0101017 A1 | 4/2018 | Tajiri |
| 2018/0217483 A1 | 8/2018 | Ashizawa et al. |
| 2018/0252993 A1* | 9/2018 | Akiyama ............. G03B 21/204 |
| 2019/0391404 A1 | 12/2019 | Tajiri |
| 2019/0391475 A1 | 12/2019 | Uchiyama |
| 2019/0391477 A1 | 12/2019 | Akiyama |
| 2020/0319541 A1 | 10/2020 | Tanaka |
| 2021/0003910 A1 | 1/2021 | Akagawa et al. |
| 2021/0321066 A1 | 10/2021 | Yogo |
| 2022/0100069 A1* | 3/2022 | Ito ........................ H04N 9/3182 |

FOREIGN PATENT DOCUMENTS

| | | |
|---|---|---|
| JP | 2011-258515 A | 12/2011 |
| JP | 2012-137744 A | 7/2012 |
| JP | 2012-234161 A | 11/2012 |
| JP | 2014-186115 A | 10/2014 |
| JP | 2018-124319 A | 8/2018 |
| JP | 2019-061082 A | 4/2019 |
| JP | 2019-219517 A | 12/2019 |
| JP | 2019-219625 A | 12/2019 |
| JP | 2020-170064 A | 10/2020 |
| JP | 2021-012284 A | 2/2021 |
| WO | 2020/137749 A1 | 7/2020 |

* cited by examiner

FIG. 5

LIGHT SOURCE SYSTEM

CROSS-REFERENCE OF RELATED APPLICATIONS

This application is the U.S. National Phase under 35 U.S.C. § 371 of International Patent Application No. PCT/JP2023/009041, filed on Mar. 9, 2023, which in turn claims the benefit of Japanese Patent Application No. 2022-057418, filed on Mar. 30, 2022, the entire disclosures of which Applications are incorporated by reference herein.

TECHNICAL FIELD

The present disclosure generally relates to light source systems and specifically relates to a light source system including a laser light source.

BACKGROUND ART

Patent Literature 1 discloses a display device including a red light source, a green light source, a blue light source, and a multiplexing prism. In the display device disclosed in Patent Literature 1, a red semiconductor laser is used as the red light source, a blue semiconductor laser is used as the blue light source, and a second harmonic generation (SHG) laser is used as the green light source.

The configuration disclosed in Patent Literature 1 is a configuration of a display device, is not intended for illumination application use, and is difficultly used as a light source for illumination adjustable in brightness and color and requiring spectra having good color-rendering properties.

CITATION LIST

Patent Literature

Patent Literature 1: JP 2007-156438 A

SUMMARY OF INVENTION

It is an object of the present disclosure to provide a light source system adjustable in brightness and color and having an improved color-rendering property.

A light source system of an aspect according to the present disclosure includes a first light source device, a second light source device, a splitting unit, a wavelength converter, a combining optical system, and a control device. The first light source device includes a first laser light source and is configured to emit first light having a first wavelength. The second light source device includes a second laser light source and is configured to emit second light having a second wavelength which is a longer wavelength than the first wavelength. The splitting unit is configured to split the first light emitted from the first light source device into third light having a third wavelength which is the same wavelength as the first wavelength and fourth light having a fourth wavelength which is the same wavelength as the first wavelength. The wavelength converter is configured to be excited by the third light to emit fifth light having a luminescence peak at a fifth wavelength between the third wavelength and the second wavelength. The combining optical system is configured to combine the second light, the fourth light, and the fifth light together. The control device is configured to control a light output of the second light source device and a split ratio between the third light and the fourth light in the splitting unit.

DESCRIPTION OF EMBODIMENTS

The drawings to be referred to in the following description of first and second embodiments and the like are all schematic representations. Thus, the ratio of the dimensions (including thicknesses) of respective constituent elements illustrated on the drawings does not always reflect their actual dimensional ratio.

First Embodiment

A light source system 100 according to a first embodiment will be described below with reference to FIGS. 1, 2A, 2B, 2C, 3, and 4.

(1.1) Overview

Figure 1:
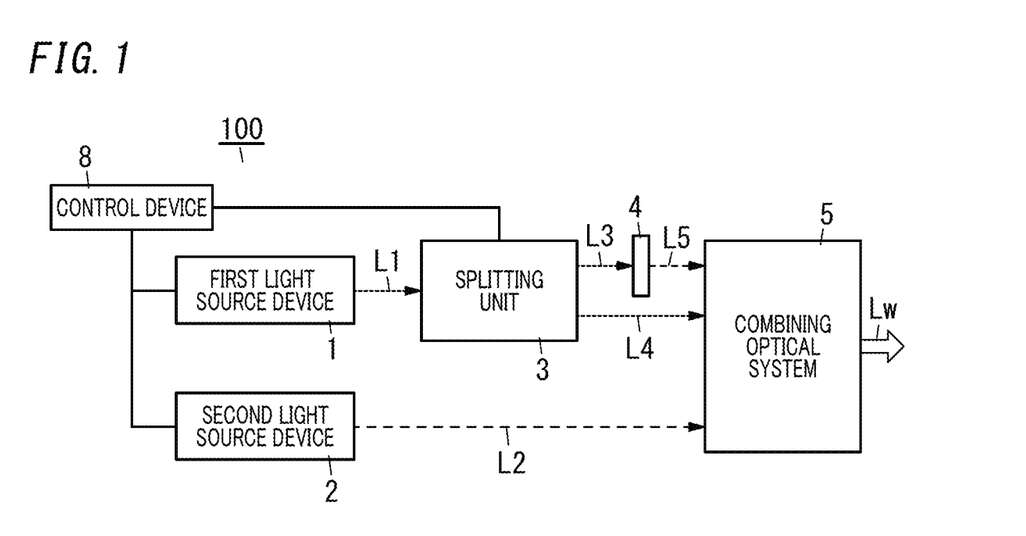
FIG. 1 is a conceptual view of a light source system according to a first embodiment.

As shown in FIG. 1, the light source system 100 includes a first light source device 1, a second light source device 2, a splitting unit 3, a wavelength converter 4, a combining optical system 5, and a control device 8. The first light source device 1 includes a first laser light source 10 (see FIG. 3) and emits first light L1 having a first wavelength λ1 (see FIG. 2A). The first wavelength 21 of the first light L1 is the same as the wavelength of light emitted from the first laser light source 10. The second light source device 2 includes a second laser light source 20 (see FIG. 3) and emits second light L2 having a second wavelength 22 (see FIG. 2C) which is a longer wavelength than the first wavelength 21. The second wavelength 22 of the second light L2 is the same as the wavelength of light emitted from the second laser light source 20. The splitting unit 3 splits the first light L1 emitted from the first light source device 1 into third light L3 having a third wavelength 23 (see FIG. 2A) which is the same wavelength as the first wavelength λ1 and fourth light L4 having a fourth wavelength 24 (see FIG. 2A) which is the same wavelength as the first wavelength 21. The wavelength converter 4 is excited by the third light L3 to emit fifth light L5 having a luminescence peak at a fifth wavelength λ5 (see FIG. 2B) between the third wavelength 23 and the second wavelength 22. The combining optical system 5 combines the second light L2, the fourth light L4, and the fifth light L5 together. The control device 8 controls a light output of the second light source device 2 and a split ratio between the third light L3 and the fourth light L4 in the splitting unit 3.

(1.2) Configuration of Light Source System

Figure 3:
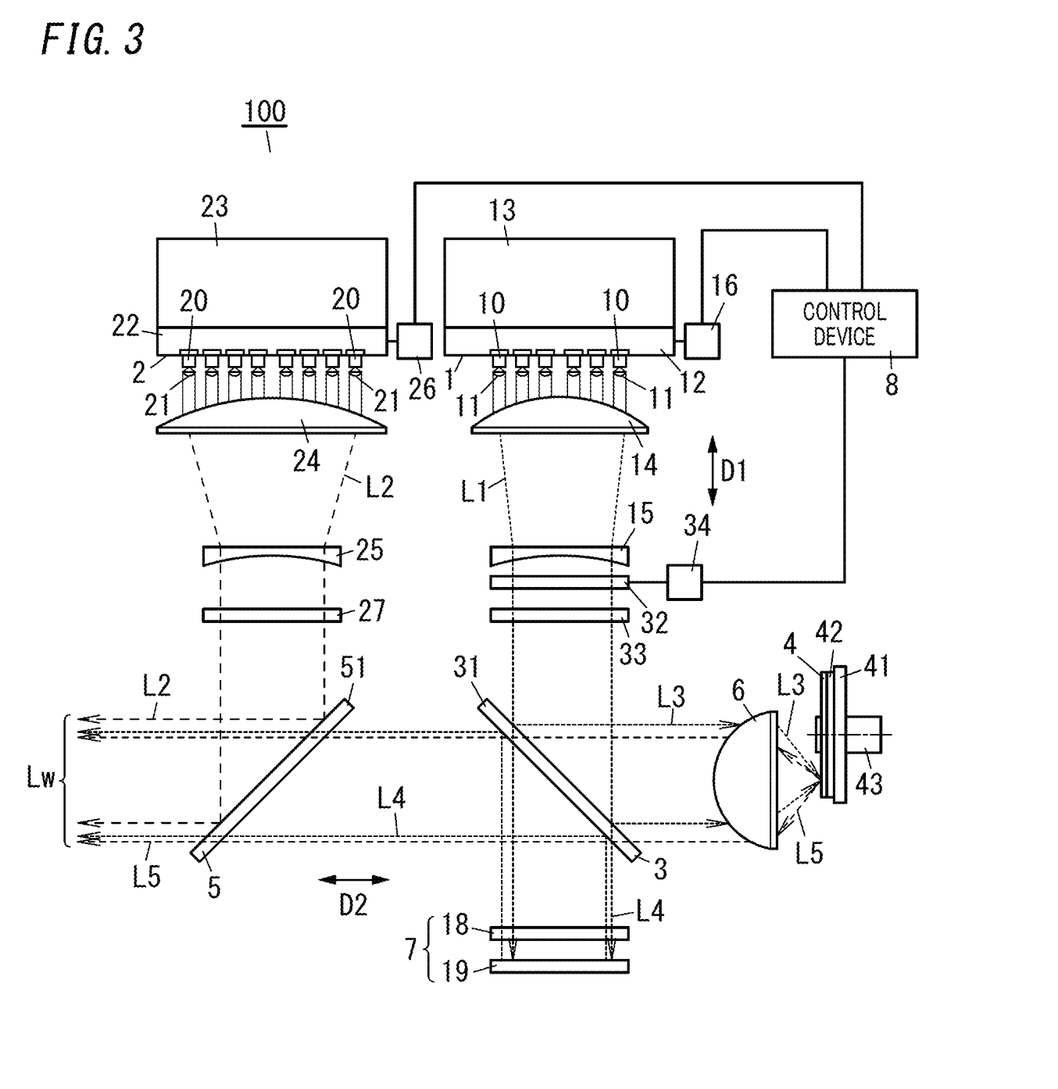
FIG. 3 is a configuration diagram of the light source system.

As shown in FIG. 3, the light source system 100 includes the first light source device 1, the second light source device 2, the splitting unit 3, the wavelength converter 4, the combining optical system 5, and the control device 8. Moreover, the light source system 100 includes a first drive circuit 16 and a second drive circuit 26. Further, the light source system 100 further includes a first plano-concave lens 15, a second plano-concave lens 25, and a second diffusion panel 27. Furthermore, the light source system 100 further includes a condenser lens 6 and a polarization direction changing unit 7.

The first light source device 1 includes a plurality of (e.g., 24) first laser light sources 10, a plurality of (e.g., 24) first collimating lenses 11, and a first plano-convex lens 14. Moreover, the first light source device 1 further includes a first circuit board 12 and a first heat sink 13.

In the first light source device 1, the plurality of first laser light sources 10 are mounted on the first circuit board 12. The first circuit board 12 is, for example, a printed wiring board. The plurality of first laser light sources 10 are arranged in a matrix (e.g., in a 6×4 matrix) on a principal surface of the first circuit board 12. The first heat sink 13 is connected to the first circuit board 12.

Each of the plurality of first laser light sources 10 is, for example, a semiconductor laser having an emission wavelength of greater than or equal to 440 nm and less than or equal to 470 nm. The plurality of first laser light sources 10 are driven by the first drive circuit 16. The first wavelength $\lambda 1$ of the first light L1 emitted from the first light source device 1 is the same as the wavelength of light emitted from each first laser light source 10. Thus, the first light L1 is blue light having a peak wavelength in the wavelength range of from greater than or equal to 440 nm to less than or equal to 470 nm. The blue light to be emitted from each of the plurality of first laser light sources 10 is emitted in the form of linearly polarized light.

The plurality of first collimating lenses 11 correspond to the plurality of first laser light sources 10 on a one-to-one basis. Each of the plurality of first collimating lenses 11 collimates the first light L1 emitted from a corresponding first laser light source 10 of the plurality of first laser light sources 10. Light collimated by the plurality of first collimating lenses 11 passes through a convex surface (light incident surface) of the first plano-convex lens 14 and a flat surface (light-emitting surface) of the first plano-convex lens 14 and is then emitted.

The second light source device 2 includes a plurality of (e.g., 24) second laser light sources 20, a plurality of second collimating lenses 21, a second plano-convex lens 24, a second circuit board 22, and a second heat sink 23.

In the second light source device 2, the plurality of second laser light sources 20 are mounted on the second circuit board 22. The second circuit board 22 is, for example, a printed wiring board. The plurality of second laser light sources 20 are arranged in a matrix (e.g., in a 6×4 matrix) on a principal surface of the second circuit board 22. The second heat sink 23 is connected to the second circuit board 22.

Each of the plurality of second laser light sources 20 is, for example, a semiconductor laser having an emission wavelength of greater than or equal to 630 nm and less than or equal to 650 nm. The second wavelength $\lambda 2$ of the second light L2 emitted from the second light source device 2 is the same as the wavelength of light emitted from each second laser light source 20. Thus, the second light L2 is red light having a peak wavelength in the wavelength range of from greater than or equal to 630 nm to less than or equal to 650 nm. The red light to be emitted from each of the plurality of second laser light sources 20 is emitted in the form of linearly polarized light.

The plurality of second collimating lenses 21 correspond to the plurality of second laser light sources 20 on a one-to-one basis. Each of the plurality of second collimating lenses 21 collimates the second light L2 emitted from a corresponding second laser light source 20 of the plurality of second laser light sources 20. Light collimated by the plurality of second collimating lenses 21 passes through a convex surface (light incident surface) of the second plano-convex lens 24 and a flat surface (light-emitting surface) of the second plano-convex lens 24 and is then emitted.

The first plano-concave lens 15 is arranged between the first light source device 1 and the splitting unit 3 in a first direction D1. The first plano-concave lens 15 has a flat surface (light incident surface) and a concave surface (light-emitting surface) and is arranged such that in the first direction D1, the flat surface of the first plano-concave lens 15 is located on a side where the first light source device 1 is located and the concave surface of the first plano-concave lens 15 is located on a side where the splitting unit 3 is located. The lens diameter of the first plano-concave lens 15 is smaller than the lens diameter of the first plano-convex lens 14.

The second plano-concave lens 25 is arranged between the second light source device 2 and the combining optical system 5 in the first direction D1. The second plano-concave lens 25 has a flat surface (light incident surface) and a concave surface (light-emitting surface) and is arranged such that in the first direction D1, the flat surface of the second plano-concave lens 25 is located on a side where the second light source device 2 is located and the concave surface of the second plano-concave lens 25 is located on a side where the combining optical system 5 is located. The lens diameter of the second plano-concave lens 25 is smaller than the lens diameter of the second plano-convex lens 24.

The splitting unit 3 includes a half-wavelength plate 32 (waveplate), a first diffusion panel 33, and a first dichroic mirror 31 (polarization beam splitter). In the splitting unit 3, the half-wavelength plate 32, the first diffusion panel 33, and the first dichroic mirror 31 are aligned in the first direction D1 in the order of the half-wavelength plate 32, the first diffusion panel 33, and the first dichroic mirror 31 from the side where the first light source device 1 is located.

The half-wavelength plate 32 is a retardation plate configured to introduce a phase difference of about one-half wavelengths at a dominant wavelength of the first laser light sources 10, and the half-wavelength plate 32 changes the polarization direction of linearly polarized light incident thereon. The half-wavelength plate 32 is arranged, for example, such that light to be incident on the first dichroic mirror 31 includes 80% S-polarized components and 20% P-polarized components, but the ratio between the S-polarized component and the P-polarized component is not limited to 80%: 20% but may be, for example, 90%: 10% or 70%: 30%.

The first diffusion panel 33 diffuses light incident on its surface facing the half-wavelength plate 32 by fine recesses and projections on its light-emitting surface facing the first dichroic mirror 31 and then emits the light.

In the light source system 100, the first light source device 1, the first plano-concave lens 15, the half-wavelength plate 32, the first diffusion panel 33, the first dichroic mirror 31, and the polarization direction changing unit 7 are aligned in the first direction D1 in the order of the first light source device 1, the first plano-concave lens 15, the half-wavelength plate 32, the first diffusion panel 33, the first dichroic mirror 31, and the polarization direction changing unit 7. Moreover, in the light source system 100, the combining optical system 5, the first dichroic mirror 31, the condenser lens 6, and the wavelength converter 4 are aligned in a second direction D2 orthogonal to the first direction D1 in the order of the combining optical system 5, the first dichroic mirror 31, the condenser lens 6, and the wavelength converter 4. The first dichroic mirror 31 reflects part of the first light L1 from the first light source device 1 and transmits part of a remaining portion of the first light L1. In the light source system 100, light which is part of the first light L1 emitted from the first light source device 1 and which has been reflected off the first dichroic mirror 31 toward the wavelength converter 4 is the third light L3. Moreover, in the light source system 100, light which is part of the first light L1 emitted from the first light source device 1 and which has been transmitted through the first dichroic mirror 31 is the fourth light L4.

Figure 4:
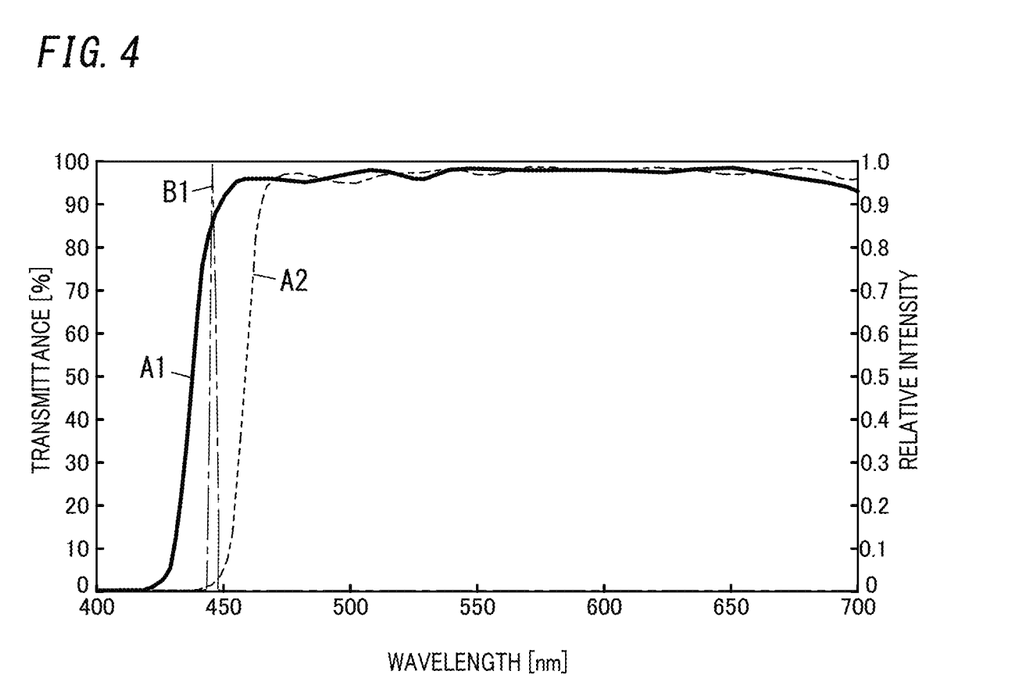
FIG. 4 is a view of spectra illustrating spectroscopic characteristics of a first dichroic mirror and first light emitted from a first light source device in the light source system.

FIG. 4 shows spectroscopic characteristics of the first dichroic mirror 31 and an emission spectrum B1 of light emitted from each first laser light source 10. The emission spectrum B1 of the light emitted from each first laser light source 10 is the same as the spectrum of the first light L1 emitted from the first light source device 1. The spectroscopic characteristics of the first dichroic mirror 31 are shown as transmittance with respect to the wavelength. In FIG. 4, A1 shows the spectroscopic characteristic with respect to the P-polarized component, and A2 in FIG. 4 shows the spectroscopic characteristic with respect to the S-polarized component. The emission spectrum B1 is shown as a relative intensity with respect to the wavelength. The first dichroic mirror 31 reflects S-polarized light of the first light L1 having a wavelength of about 445 nm and transmits P-polarized light. In the light source system 100, the third light L3 described above includes the S-polarized component reflected off the first dichroic mirror 31 of the first light L1, and the fourth light L4 described above includes the P-polarized component of the first light L1 transmitted through the first dichroic mirror 31.

The third light L3 (the S-polarized component reflected off the first dichroic mirror 31 of the first light L1) is collected by the condenser lens 6 and is incident on the wavelength converter 4.

The wavelength converter 4 includes a first wavelength conversion element which is configured to be excited by the third light L3 to emit light having the wavelength of the fifth light L5. The third light L3 is, for example, blue light. The fifth light L5 is, yellow light.

The first wavelength conversion element included in the wavelength converter 4 is excited by the third light L3 incident on the wavelength converter 4, and thereby, the wavelength converter 4 emits the fifth light L5 including yellow light. The fifth light L5 is fluorescence including light components over the entire wavelength range of from greater than or equal to 500 nm to less than or equal to 600 nm.

Figure 2A:
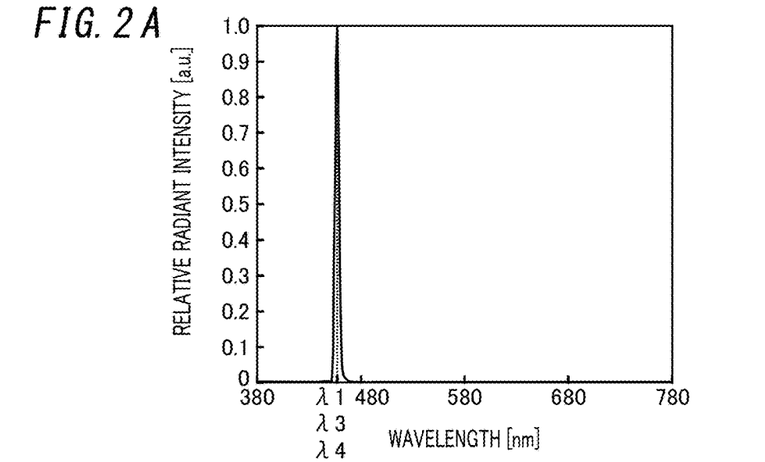
FIG. 2A is a spectrum of light emitted from a first laser light source in the light source system.
Figure 2B:
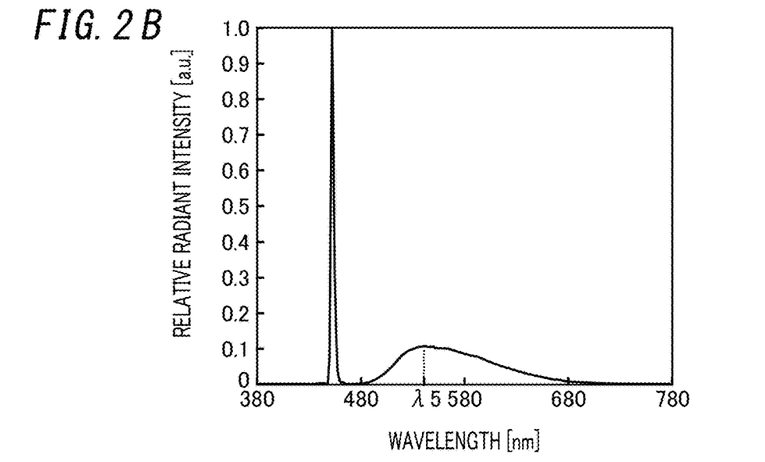
FIG. 2B is a spectrum including the spectrum of the light emitted from the first laser light source and a fluorescence spectrum of a wavelength conversion element of a wavelength converter in the light source system.
Figure 2C:
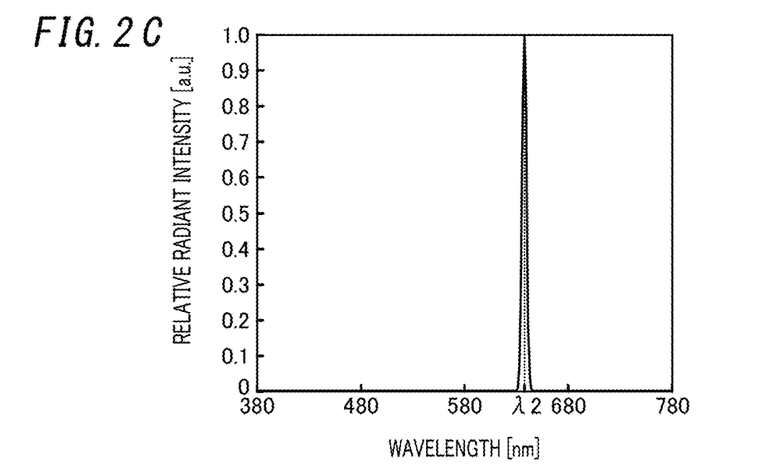
FIG. 2C is a spectrum of light emitted from a second laser light source in the light source system.

The wavelength converter 4 includes, for example, a light transmitting material part and phosphor particles. In this case, the wavelength converter 4 is formed from a mixture of the light transmitting material part and the phosphor particles. In the wavelength converter 4, a large number of phosphor particles are present in the light transmitting material part. A material (light transmitting material) for the light transmitting material part is preferably a material which is highly transmissive to visible light. The light transmitting material is, for example, a silicone-based resin. Examples of the "silicone-based resin" include a silicone resin and a modified silicone resin. As the phosphor particles, for example, yellow phosphor particles which radiate yellow light may be employed. Light (fluorescence) radiated from the yellow phosphor particles preferably has an emission spectrum having a peak wavelength in a wavelength range of, for example, from greater than or equal to 530 nm to less than or equal to 580 nm. The phosphor particles are, for example, but not limited to, $Y_3Al_5O_{12}:Ce^{3+}$. FIG. 2B shows an example of the spectrum of light emitted from the wavelength converter 4 when $Y_3Al_5O_{12}:Ce^{3+}$ is excited by laser light having an emission wavelength of 445 nm.

As shown in FIG. 3, the light source system 100 further includes a glass substrate 41, a reflecting film 42, and a motor 43. The glass substrate 41 is arranged such that a thickness direction defined with respect to the glass substrate 41 is parallel to the second direction D2. The glass substrate 41 is coupled to a rotary shaft of the motor 43. The motor 43 rotates the glass substrate 41. The reflecting film 42 is a dielectric multilayer film which is interposed between the wavelength converter 4 and the glass substrate 41 and which reflects visible light. The wavelength converter 4 has a ring shape when viewed in the second direction D2. When viewed in the second direction D2, an outer edge of the glass substrate 41 has a circular shape.

The fifth light L5 emitted from the wavelength converter 4 toward the condenser lens 6 is collimated by the condenser lens 6, passes through the first dichroic mirror 31 and the combining optical system 5, and is then emitted.

The polarization direction changing unit 7 converts the P-polarized component (fourth light L4) of the first light L1 transmitted through the first dichroic mirror 31 into the S-polarized light. The fourth light L4 which has been converted by the polarization direction changing unit 7 into the S-polarized light is reflected off the first dichroic mirror 31 toward a second dichroic mirror 51.

The polarization direction changing unit 7 includes a quarter-wavelength plate 18 and a reflector 19. In the light source system 100, the fourth light L4, which is the P-polarized light, is incident on the quarter-wavelength plate 18. The quarter-wavelength plate 18 is a retardation plate configured to introduce a phase difference of about one-quarter wavelengths at about a peak wavelength (also referred to as a dominant wavelength) of light emitted from the first laser light sources 10. In the light source system 100, the fourth light L4, which is the P-polarized light, incident on the quarter-wavelength plate 18 is converted by the quarter-wavelength plate 18 into circularly polarized light, is subjected to phase inversion by the reflector 19, and is then subjected to polarization conversion by the quarter-wavelength plate 18 again, thereby resulting in the S-polarized light. The reflector 19 includes, for example, a glass substrate and a reflecting film made of an aluminum film or a dielectric multilayer film formed on the glass substrate. The fourth light L4 which has been converted by the polarization direction changing unit 7 into the S-polarized light is reflected off the first dichroic mirror 31 toward the second dichroic mirror 51.

Moreover, in the light source system 100, the second light source device 2, the second plano-concave lens 25, the second diffusion panel 27, and the combining optical system 5 are aligned in the first direction D1 in the order of the second light source device 2, the second plano-concave lens 25, the second diffusion panel 27, and the combining optical system 5.

The second diffusion panel 27 diffuses the second light L2 incident on its surface facing the second plano-concave lens 25 by fine recesses and projections on its light-emitting surface facing the combining optical system 5 and then emits the second light L2.

The combining optical system 5 includes the second dichroic mirror 51. The second dichroic mirror 51 is arranged to be non-parallel to the first dichroic mirror 31. The second dichroic mirror 51 reflects the second light L2 from the second light source device 2 to an opposite side from the first dichroic mirror 31 in the second direction D2 and transmits the fourth light L4 and the fifth light L5 incident on its surface facing the first dichroic mirror 31 in the second direction D2. Thus, from the combining optical system 5, white light Lw obtained by combining the second light L2, the fourth light L4, and the fifth light L5 together is emitted.

Moreover, the light source system 100 further includes a driver 34 which rotates the half-wavelength plate 32 around the optical axis of the half-wavelength plate 32. In the light source system 100, rotating the half-wavelength plate 32 enables the intensity of the first light L1 emitted from the half-wavelength plate 32 to be controlled.

Moreover, in the light source system 100, the control device 8 controls each of the first drive circuit 16, the second drive circuit 26, and the driver 34.

The control device 8 controls each of the first drive circuit 16, the second drive circuit 26, and the driver 34 in accordance with a signal (e.g., input signal instructing at least one of a brightness adjustment or a color adjustment) given from, for example, an external device. In the light source system 100, the control device 8 controls the first drive circuit 16 and the driver 34, thereby controlling the intensity of the first light L1 (blue light), the intensity of the third light L3 (blue light) incident on the wavelength converter 4, the intensity of the fourth light L4 incident on the combining optical system 5, and the intensity of the fifth light L5 (yellow light) emitted from the wavelength converter 4 and being incident on the combining optical system 5. Moreover, in the light source system 100, the control device 8 controls the second drive circuit 26, thereby controlling the intensity of the second light (red light) L2 incident on the combining optical system 5. In the light source system 100, controlling each of the first drive circuit 16, the second drive circuit 26, and the driver 34 enables the brightness and/or the color of the white light Lw emitted from the combining optical system 5 to be adjusted. It becomes possible to change the color temperature of the white light Lw in the range of from greater than or equal to 3000 K to less than or equal to 6500 K required as the color temperature of a light source for illumination. Here, in the light source system 100, it becomes possible to change the chromaticity of the white light Lw along a blackbody trajectory.

The control device 8 includes a computer system. The computer system may include a processor and a memory element as principal hardware components thereof. The processor executes a program stored in the memory element of the computer system, thereby implementing functions as the control device 8 in the present disclosure. The program may be stored in advance in the memory element of the computer system. Alternatively, the program may also be downloaded over a telecommunications network or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very-large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be integrated together in a single device or distributed in multiple devices without limitation. As used herein, the "computer system" includes a microcontroller including one or more processors and one or more memory elements. Thus, the microcontroller may also be implemented as a single or a plurality of electronic circuits including a semiconductor integrated circuit or a large-scale integrated circuit.

In the light source system 100, a power supply voltage is supplied to the first drive circuit 16, for example, from a first power supply circuit of a power supply unit. Moreover, a power supply voltage is supplied to the second drive circuit 26, for example, from a second power supply circuit of the power supply unit. Moreover, a power supply voltage is supplied to the control device 8, for example, from a third power supply circuit of the power supply unit. The first power supply circuit, the second power supply circuit, and the third power supply circuit are not included in components of the light source system 100, but this should not be construed as limiting. The first power supply circuit, the second power supply circuit, and the third power supply circuit may be included in the components of the light source system 100.

(1.3) Summary

The light source system 100 according to the first embodiment includes the first light source device 1, the second light source device 2, the splitting unit 3, the wavelength converter 4, the combining optical system 5, and the control device 8. The first light source device 1 includes the first laser light sources 10 and emits the first light L1 having the first wavelength λ1. The second light source device 2 includes the second laser light source 20 and emits the second light L2 having the second wavelength λ2 which is a longer wavelength than the first wavelength λ1. The splitting unit 3 splits the first light L1 emitted from the first light source device 1 into the third light L3 having the third wavelength λ3 which is the same wavelength as the first wavelength λ1 and the fourth light L4 having the fourth wavelength λ4 which is the same wavelength as the first wavelength λ1. The wavelength converter 4 is excited by the third light L3 to emit the fifth light L5 having the luminescence peak between the third wavelength λ3 and the second wavelength λ2. The combining optical system 5 combines the second light L2, the fourth light L4, and the fifth light L5 together. The control device 8 controls the light output of the second light source device 2 and the split ratio between the third light L3 and the fourth light L4 in the splitting unit 3.

The light source system 100 according to the first embodiment is adjustable in brightness and color and having an improved color-rendering property.

Incidentally, when blue light emitted from a blue laser light source and yellow light emitted from a yellow phosphor (e.g., YAG phosphor) are combined together to produce white light, white light having a relatively high correlated color temperature (e.g., 6500 K) can be produced, but the range of from 3000 K to 6000 K required as a light source for illumination cannot be covered. Moreover, even when the balance between the blue light emitted from the blue laser light source and the yellow light emitted from the yellow phosphor (e.g., YAG phosphor) is adjusted, the correlated color temperature of obtained white light does not move on the blackbody trajectory. Moreover, when Eu-activated (Sr,Ca)AlSiN$_3$ (referred to as "SCASN") or Eu-activated CaAlSiN$_3$ (referred to as "CASN") is used to produce white light having a relatively low color temperature, the light emission efficiency significantly decreases in the case of high density excitation by laser light.

Moreover, light obtained by combining the blue light emitted from the blue laser light source, green light emitted from a green laser light source, and red light emitted from a red laser light source together has the problem that a speckle noise is large and the problem that the color rendering property is poor.

The light source system 100 according to the first embodiment is adjustable in each of the intensity of the first light L1 including blue light emitted from the first light source device 1 including the first laser light sources 10, the intensity of the fifth light L5 including yellow light emitted from the wavelength converter 4, and the intensity of the second light L2 including red light emitted from the second light source device 2, and the correlated color temperature of the combined light emitted from the combining optical system 5 is adjustable at least in the range of from greater than or equal to 3000 K to less than or equal to 5000 K. The correlated color temperature is used as a temperature representing the light color of a light source (here, the light source system 100) and is defined as an absolute temperature of blackbody radiation having chromaticity coordinates closest to uv chromaticity coordinates of the light source. The correlated color temperature is defined by, for example, JIS Z8113: 1998 and IEC 60050-845. The correlated color temperature is a value obtained in accordance with the measurement method of the correlated color temperature defined by, for example, JIS Z8725:1999. The chromaticity coordinates, which are closest to the chromaticity coordinates of the light source and which the blackbody radiation has, are obtained as an intersection point when a perpendicular line is extended from a point represented by the chromaticity coordinates of the light source to the blackbody radiation trajectory in the CIE 1960 uniform-chromaticity-scale (UCS) diagram.

Moreover, in the light source system 100, the splitting unit 3 includes the half-wavelength plate 32, the polarization beam splitter (first dichroic mirror 31), and the driver 34 configured to rotate the half-wavelength plate 32 around the optical axis of the half-wavelength plate 32. Thus, when in the light source system 100 according to the first embodiment, the correlated color temperature of the combined light is changed, the absolute value of $D_{UV}$ can be further reduced. The $D_{UV}$ is defined by, for example, JIS Z8725-1999. The $D_{UV}$ is a value ($D_{UV}$=1000 $d_{UV}$) obtained by multiplying $d_{UV}$ which is a deviation from the blackbody radiation trajectory in the CIE 1960 UCS diagram by 1000. The $d_{UV}$ and the $D_{UV}$ are positive values when the chromaticity coordinates of white light Lw emitted from a light source (here, the light source system 100) are on an upper side of the blackbody radiation trajectory, and the $d_{UV}$ and the $D_{UV}$ are negative values when the chromaticity coordinates are on a lower side of the blackbody radiation trajectory. In the light source system 100, the chromaticity coordinates of the combined light are also variable on the blackbody trajectory. Saying that "when the correlated color temperature of the combined light is changed, the chromaticity coordinates are variable on the blackbody trajectory" means that the $D_{UV}$ becomes 0.

Moreover, the light source system 100 allows the color rendering property to be improved. Saying that "the color rendering property is improved" means that, for example, the average color rendering index Ra is increased.

Second Embodiment

Figure 5:
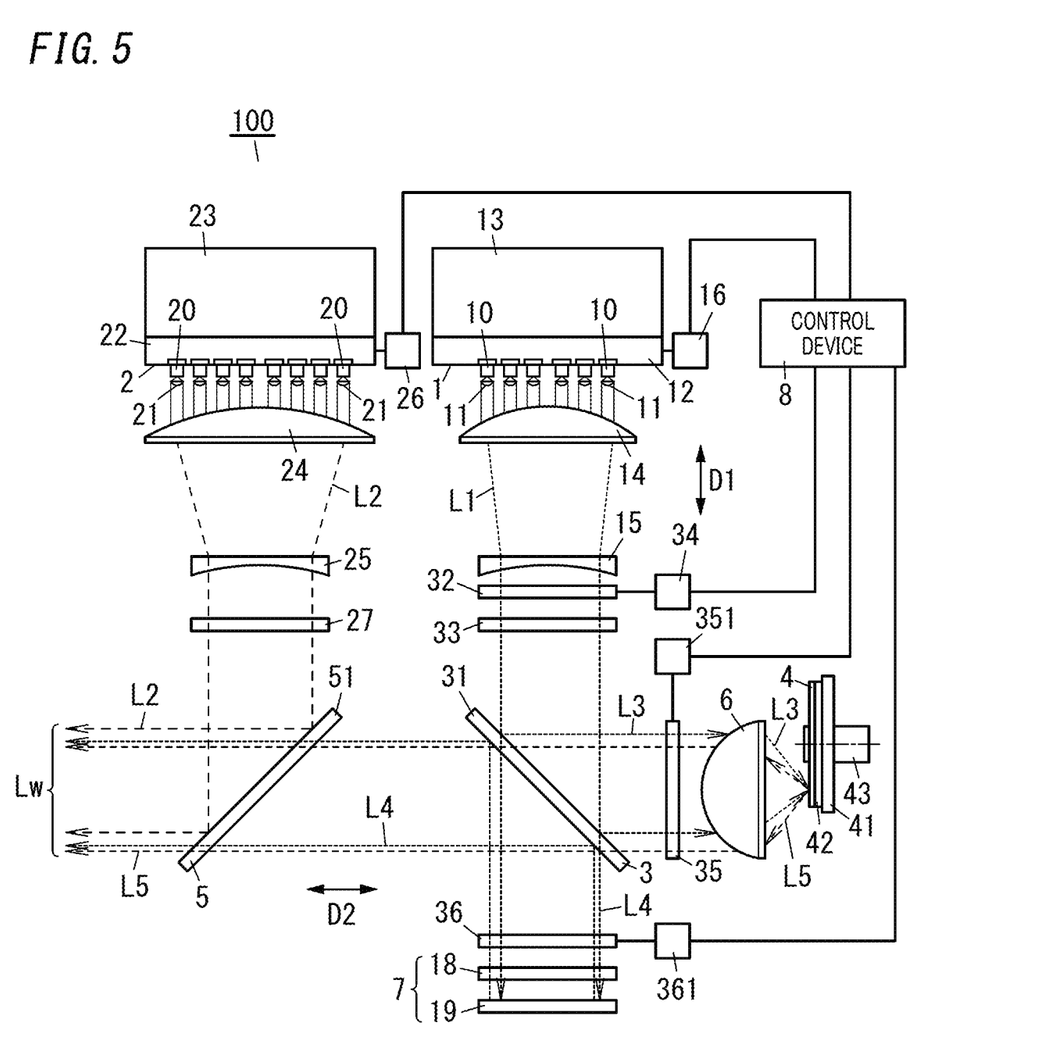
FIG. 5 is a configuration diagram of a light source system according to a second embodiment.

With reference to FIG. 5, a light source system 100 according to a second embodiment will be described below.

The light source system 100 according to the second embodiment is different from the light source system 100 according to the first embodiment in that a splitting unit 3 further includes a brightness adjusting device 35 (hereinafter also referred to as a first brightness adjusting device 35) and a brightness adjusting device 36 (hereinafter also referred to as a second brightness adjusting device 36). In the light source system 100 according to the second embodiment, components similar to those in the light source system 100 according to the first embodiment are denoted by the same reference signs as those in the first embodiment, and the description thereof is omitted.

The first brightness adjusting device 35 is located between a first dichroic mirror 31 and a condenser lens 6 in the second direction D2.

The second brightness adjusting device 36 is location between the first dichroic mirror 31 and a polarization direction changing unit 7 in the first direction D1.

Moreover, the light source system 100 according to the second embodiment further includes a third drive circuit 351 configured to drive the first brightness adjusting device 35 and a fourth drive circuit 361 configured to drive the second brightness adjusting device 36.

Each of the first brightness adjusting device 35 and the second brightness adjusting device 36 is, for example, a liquid crystal element (liquid crystal panel). The first brightness adjusting device 35 and the second brightness adjusting device 36 are controlled by a control device 8. The control device 8 controls the third drive circuit 351, thereby controlling the first brightness adjusting device 35. More specifically, the control device 8 controls the transmittance of the liquid crystal element included in the first brightness adjusting device 35, thereby adjusting the brightness of each of third light L3 and fifth light L5. The control device 8 controls the fourth drive circuit 361, thereby controlling the second brightness adjusting device 36. More specifically, the control device 8 controls the transmittance of the liquid crystal element included in the second brightness adjusting device 36, thereby adjusting the brightness of fourth light L4. The control device 8 can control also the first brightness adjusting device 35 and the second brightness adjusting device 36 in accordance with the input signal explained in the first embodiment.

Since the light source system 100 according to the second embodiment includes the first brightness adjusting device 35 and the second brightness adjusting device 36, the light source system 100 according to the second embodiment enables brightness adjustment control to be performed with a further reduced variation width of a light output in a brightness adjustment range and enables color adjustment control to be performed with a further reduced variation width of chromaticity in a color adjustment range as compared with the light source system 100 according to the first embodiment.

(Variations)

The first and second embodiments described above are mere examples of various embodiments of the present disclosure. The first and second embodiments described above may be modified in various manners depending on the design or the like, as long as the object of the present disclosure is achieved.

For example, the first light source device 1 is not limited to including the plurality of first laser light sources 10, but the first light source device 1 may include a single first laser light source 10. Moreover, the second light source device 2 is not limited to including the plurality of second laser light sources 20, but the second light source device 2 may include a single second laser light source 20.

Moreover, the light source system 100 according to the second embodiment includes the two brightness adjusting devices 35 and 36 but may include at least one brightness adjusting device of the two brightness adjusting devices 35 or 36.

Moreover, in the light source system 100 of the second embodiment, each of the first brightness adjusting device 35 and the second brightness adjusting device 36 is not limited to the liquid crystal element but may be, for example, an electrophoretic element.

(Aspects)

The first and second embodiments and the like described above disclose the following aspects in the present specification.

A light source system (100) of a first aspect includes a first light source device (1), a second light source device (2), a splitting unit (3), a wavelength converter (4), a combining optical system (5), and a control device (8). The first light source device (1) includes a first laser light source (10) and is configured to emit first light (L1) having a first wavelength (λ1). The second light source device (2) includes a second laser light source (20) and is configured to emit second light (L2) having a second wavelength (λ2) which is a longer wavelength than the first wavelength (λ1). The splitting unit (3) is configured to split the first light (L1) emitted from the first light source device (1) into third light (L3) having a third wavelength (λ3) which is a same wavelength as the first wavelength (λ1) and fourth light (L4) having a fourth wavelength (λ4) which is the same wavelength as the first wavelength (λ1). The wavelength converter (4) is configured to be excited by the third light (L3) to emit fifth light (L5) having a luminescence peak at a fifth wavelength (λ5) between the third wavelength (λ3) and the second wavelength (λ2). The combining optical system (5) is configured to combine the second light (L2), the fourth light (L4), and the fifth light (L5) together. The control device (8) is configured to control a light output of the second light source device (2) and a split ratio between the third light (L3) and the fourth light (L4) in the splitting unit (3).

The light source system (100) of the first aspect is adjustable in brightness and color and having an improved color-rendering property.

In a light source system (100) of a second aspect referring to the first aspect, each of the first light (L1), the third light (L3), and the fourth light (L4) is blue light, the second light (L2) is red light, and the fifth light (L5) is yellow light.

In the light source system (100) of the second aspect, the fifth light (L5) is yellow light, which enables the color rendering property of white light (Lw) to be improved.

In a light source system (100) of a third aspect referring to the first aspect, the first laser light source (10) includes a semiconductor laser having an emission wavelength of greater than or equal to 440 nm and less than or equal to 470 nm. The second laser light source (20) includes a semiconductor laser having an emission wavelength of greater than or equal to 630 nm and less than or equal to 650 nm. The wavelength converter (4) is configured to be excited by the third light (L3) to emit fluorescence including light components over an entire wavelength range of from greater than or equal to 500 nm to less than or equal to 600 nm.

In the light source system (100) of the third aspect, the fifth light (L5) emitted from the wavelength converter (4) includes the light components over the entire wavelength range of from greater than or equal to 500 nm to less than or equal to 600 nm, which enables the color rendering property of white light (Lw) to be improved.

In a light source system (100) of a fourth aspect referring to any one of the first to third aspect, the splitting unit (3) include a half-wavelength plate (32), a polarization beam splitter (first dichroic mirror 31), and a driver (34). The driver (34) is configured to rotate the half-wavelength plate (32) around an optical axis of the half-wavelength plate (32).

The light source system (100) of the fourth aspect enables the intensity of the first light (L1) to be adjusted.

In a light source system (100) of a fifth aspect referring to any one of the first to third aspects, the splitting unit (3) includes a brightness adjusting device (35) configured to adjust brightness of the third light (L3).

The light source system (100) of the fifth aspect enables brightness adjustment control to be performed with a further reduced variation width of a light output in a brightness adjustment range and enables a color adjustment control to be performed with a further reduced variation width of chromaticity in a color adjustment range.

In a light source system (100) of a sixth aspect referring to any one of the first to third aspects, the splitting unit (3) includes a brightness adjusting device (36) configured to adjust brightness of the fourth light (L4).

The light source system (100) of the sixth aspect enables brightness adjustment control to be performed with a further reduced variation width of a light output in a brightness adjustment range and enables a color adjustment control to be performed with a further reduced variation width of chromaticity in a color adjustment range.

In a light source system (100) according to a seventh aspect referring to any one of the first to third aspects, the splitting unit (3) includes a first brightness adjusting device (35) which is a brightness adjusting device (35) configured to adjust brightness of the third light (L3) and a second brightness adjusting device (36) which is a brightness adjusting device (36) configured to adjust brightness of the fourth light (L4).

The light source system (100) of the seventh aspect enables brightness adjustment control to be performed with a further reduced variation width of a light output in a brightness adjustment range and enables a color adjustment control to be performed with a further reduced variation width of chromaticity in a color adjustment range.

In a light source system (100) of an eighth aspect referring to any one of the fifth to seventh aspects, the brightness adjusting device (35:36) is a liquid crystal element or an electrophoretic element.

In a light source system (100) of a ninth aspect referring to any one of the first to eighth aspects, the control device (8) is configured to control each of the first light source device (1), the splitting unit (3), and the second light source device (2) in accordance with an input signal instructing at least one of a brightness adjustment or a color adjustment.

In the light source system (100) of the ninth aspect, the control device (8) accordingly controls each of the first light source device (1), the splitting unit (3), and the second light source device (2), thereby implementing at least one of the brightness adjustment or the color adjustment according to the input signal.

REFERENCE SIGNS LIST

1 First Light Source Device
10 First Laser Light Source
2 Second Light Source Device
20 Second Laser Light Source
3 Splitting Unit
31 First Dichroic Mirror (Polarization Beam Splitter)
32 Half-Wavelength Plate
34 Driver
35 Brightness Adjusting Device (First Brightness Adjusting Device)
36 Brightness Adjusting Device (Second Brightness Adjusting Device)
4 Wavelength Converter
5 Combining Optical System
8 Control Device
100 Light Source System
L1 First Light
L2 Second Light
L3 Third Light
L4 Fourth Light
L5 Fifth Light
Lw White Light
$\lambda 1$ First Wavelength
$\lambda 2$ Second Wavelength
$\lambda 3$ Third Wavelength
$\lambda 4$ Fourth Wavelength
$\lambda 5$ Fifth Wavelength

The invention claimed is:

1. A light source system comprising:
a first light source device including a first laser light source and configured to emit first light having a first wavelength;
a second light source device including a second laser light source and configured to emit second light having a second wavelength which is a longer wavelength than the first wavelength;
a splitting unit configured to split the first light emitted from the first light source device into third light having a third wavelength which is a same wavelength as the first wavelength and fourth light having a fourth wavelength which is the same wavelength as the first wavelength;
a wavelength converter configured to be excited by the third light to emit fifth light having a luminescence peak at a fifth wavelength between the third wavelength and the second wavelength;
a combining optical system configured to combine the second light, the fourth light, and the fifth light together; and
a control device configured to control a light output of the second light source device and a split ratio between the third light and the fourth light in the splitting unit.

2. A light source system of claim 1, wherein
each of the first light, the third light, and the fourth light is blue light,
the second light is red light, and
the fifth light is yellow light.

3. The light source system of claim 1, wherein
the first laser light source includes a semiconductor laser having an emission wavelength of greater than or equal to 440 nm and less than or equal to 470 nm,
the second laser light source includes a semiconductor laser having an emission wavelength of greater than or equal to 630 nm and less than or equal to 650 nm, and
the wavelength converter is configured to be excited by the third light to emit fluorescence including light components over an entire wavelength range of from greater than or equal to 500 nm to less than or equal to 600 nm.

4. The light source system of claim 1, wherein
the splitting unit includes
a half-wavelength plate,
a polarization beam splitter, and
a driver configured to rotate the half-wavelength plate around an optical axis of the half-wavelength plate.

5. The light source system of claim 1, wherein
the splitting unit includes a brightness adjusting device configured to adjust brightness of the third light.

6. The light source system of claim 5, wherein the brightness adjusting device is a liquid crystal element or an electrophoretic element.

7. The light source system of claim 1, wherein
the splitting unit includes a brightness adjusting device configured to adjust brightness of the fourth light.

8. The light source system of claim 1, wherein
the splitting unit includes
a first brightness adjusting device which is a brightness adjusting device configured to adjust brightness of the third light and
a second brightness adjusting device which is a brightness adjusting device configured to adjust brightness of the fourth light.

9. The light source system of claim 1, wherein
the control device is configured to control each of the first light source device, the splitting unit, and the second light source device in accordance with an input signal instructing at least one of a brightness adjustment or a color adjustment.

* * * * *